Dec. 19, 1950     G. L. MILLER     2,534,675
TRACTOR TREAD FOR DISINTEGRATING CORNSTALKS
Filed Jan. 2, 1947
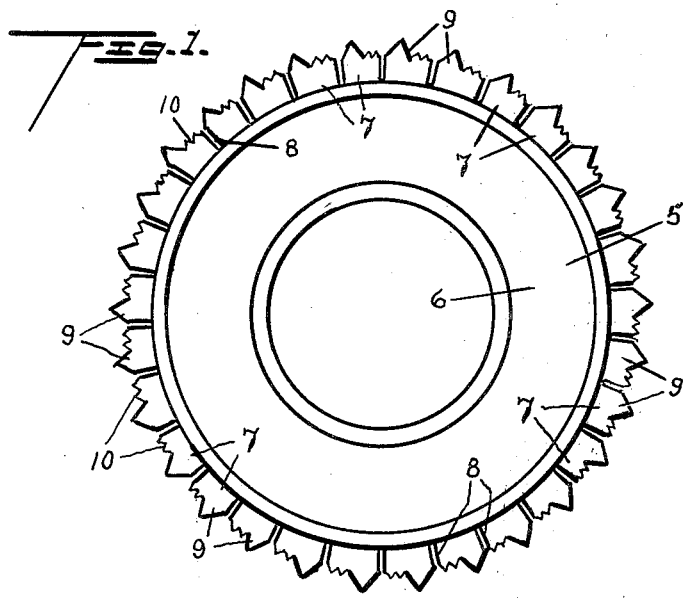
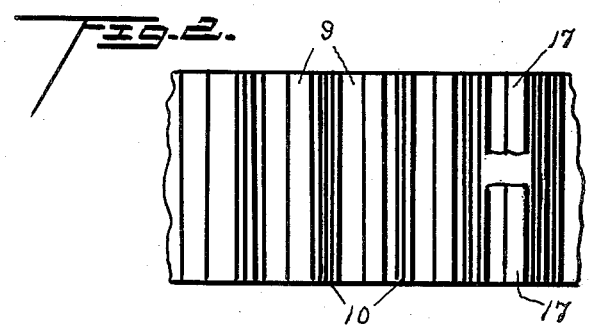
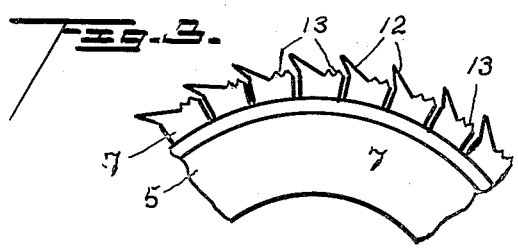
INVENTOR.
Gustave L. Miller
BY Walter N. Haskell.
his Attorney.

Patented Dec. 19, 1950

2,534,675

UNITED STATES PATENT OFFICE 2,534,675

TRACTOR TREAD FOR DISINTEGRATING CORNSTALKS

Gustave L. Miller, Geneseo, Ill.

Application January 2, 1947, Serial No. 719,729

1 Claim. (Cl. 152—209)

My invention has reference to a tire tread for use on farm tractors, for the breaking up and pulverizing of corn stalks and weeds, and is similar in character and purpose to the device set forth in my former application for Letters Patent of the United States, filed November 21, 1945, for a tire for heavy vehicles, Serial No. 630,035. The indirect object of the invention is to provide a means for the destruction of corn borers and their larvae for which the corn-stalks and adjacent weeds provide a habitat, keeping them alive from one season to the next. The invention is intended to replace the usual large wheels of a farm tractor, for operation upon and along the rows of fallen corn-stalks, after the corn has been harvested. The stalks generally fall or lop over in line with the row in which they were cultivated, and the passage of heavy wheels over the stalks frequently has the effect of forcing them into the soft earth, without crushing the stalks or insects.

In the present invention the tire tread is provided with cross-ribs of a serrated type, which have a tendency to cut and break the stalks, which ribs are alternated with smaller serrations, by which the fragments of stalks and weeds are pulverized, and fully disintegrated, with the insect life fully exterminated. The stalks in a field are destroyed to such an extent that the customary use of a stalk cutter is done away with. The best results are secured by the use of a tire having a tread which is substantially flat, and somewhat broadened from the usual width, but variations from this form may prove effective.

The above named and other features and advantages of the invention will more fully appear from the following specification, reference being had to the accompanying drawing, in which—

Fig. 1 is a side view of a tractor tire which embodies the invention.

Fig. 2 is a diagrammatic view, showing a section of the tire in flattened position, looking at the tread.

Fig. 3 is a fragmentary view of a tire provided with a modified form of the invention.

Fig. 4 shows another modified form of the invention, in detail.

In Fig. 1 is portrayed a vehicle tire such as is usually provided for the traction wheels of a tractor, and other heavy vehicles, the body of which tire is indicated at 5, with a central hub portion at 6. The body of the tire is broad and flat, as shown in Fig. 2, to more thoroughly crush the material over which it passes. The periphery of the tire is provided with a plurality of shoes 7, forming an annular tread for the tire, and separated from each other by small gaps 8. Each of the shoes 7 supports a cross-rib 9 of toothed formation, at one side of its outer face, and a series of finer teeth 10 at the other side, all of these parts being integral, and formed of a good quality of hard rubber. In the movement of a wheel thus equipped along a corn-stalk row the stalks are cut or mashed into short pieces by the ribs 9, with the broken parts forced inwardly between an adjacent pair of the ribs 9, and against the smaller serrations 10, where they are fully ground and pulverized, to such an extent as to completely dispose of all corn borers and their larvae or other insect life contained in the stalks or weeds in the vicinity thereof.

The shoes 7 possess a sufficient amount of resiliency to permit a slight yield of the ribs 9 as they come into contact with the earth or objects thereon, which might cause injury or undue wear thereto. Said shoes are also self cleaning, by reason of the gaps 8, which open and close to some extent when in use.

In Fig. 3 is shown a form of the tire tread wherein the ribs 9 are replaced by ribs 12, of a more ratchet-tooth form, each pair of which is separated by smaller serrations 13. The operation is the same as in the case of the tire hereinbefore described.

In Fig. 4 is shown one of the shoes 7 with a rib 15 in the center and groups of serrations 16 at each side, giving a greater amount of grinding and pulverizing space. The passage of a wheel equipped with the invention over a corn row not only destroys the stalks and insects, but has the effect of a roller, breaking up the clods, and smoothing the ground. It also is useful in destroying the young weeds in the early part of the year, before the grain has been planted, or has shown itself above the ground.

The ribs 9 are not limited to the form shown herein, but can be changed to meet the demands. They can be formed of two parts, as shown at the right in Fig. 2, with a clearance space between.

What I claim as my invention, and desire to secure, is:

In a device for disintegrating corn-stalks and other material, the combination with the tire of a heavy vehicle, of a broad and flat tread formed integrally with said tire, and resilient shoes mounted on the tread, with a narrow spacing between the shoes, each shoe provided with a tooth cross-rib forming a cutting member, and a series of serrations relatively smaller than the cross-rib and alternating therewith, for a further pulverizing action.

GUSTAVE L. MILLER.

REFERENCES CITED

The following references are of record in the file of this patent:

UNITED STATES PATENTS

| Number | Name | Date |
|---|---|---|
| D. 97,255 | Bourdon | Oct. 22, 1935 |
| 1,012,459 | Siegrist | Dec. 19, 1911 |

FOREIGN PATENTS

| Number | Country | Date |
|---|---|---|
| 799,105 | France | June 6, 1936 |